United States Patent [19]
Raduly et al.

[11] 3,803,803
[45] Apr. 16, 1974

[54] PROCESS FOR GAS DEMERCURATION

[75] Inventors: Lajos Raduly; Ioan Urmosi; Nita Todereanu; Nicolae Chiroiu, all of Rimnicu Vilcea, Romania

[73] Assignee: Grupul Industrial de Chimie, Rimnicu, Vilcea, Romania

[22] Filed: June 6, 1972

[21] Appl. No.: 260,172

[30] Foreign Application Priority Data
June 7, 1971   Romania............................. 67191

[52] U.S. Cl. ....................................... 55/72, 55/74
[51] Int. Cl. .............................................. B01d 53/04
[58] Field of Search .......... 55/72, 74, 387, 75, 389; 423/210, 508, 509

[56] References Cited
UNITED STATES PATENTS
3,257,776   6/1966   Park et al. ........................... 55/72
3,193,987   7/1965   Manes et al. ........................ 55/72

Primary Examiner—Charles N. Hart
Attorney, Agent, or Firm—Karl F. Ross; Herbert Dubno

[57] ABSTRACT

A process and a contact mass for demercuration (removal of mercury) of various gases (air in industrial rooms, hydrogen from an electrolysis plant using a mercury cathode, etc.).

According to the process, the polluted gas is passed, at ambient temperature and at atmospheric pressure or higher, through a fixed bed out of contact mass. This consists of a porous material (such as active carbon, silica gel or alumina), impregnated with an aqueous solution of a trivalent iron salt. The excess water is run off, and the impregnated mass may be dried superficially before utilization.

2 Claims, No Drawings

PROCESS FOR GAS DEMERCURATION

The present invention relates to a process for the removal of mercury from various gases, such as: hydrogen obtained by electrolysis with mercury cathode, air polluted with mercury in industrial rooms or other gases containing mercury vapors.

There exist known processes for the removal of mercury from various gases, since the pollution of air with mercury vapors is dangerous to human health, while the mercury contained in electrolytic hydrogen constitutes a poison for many hydrogenation catalysts. These processes consist in the bubbling of the gases through solutions containing sodium hypochlorite or sodium sulphide.

The above processes have the disadvantage that they have no applicability for the removal of mercury from polluted air and from electrolytic hydrogen used in catalytic processes, since these become contaminated with chlorine and with hydrogen sulphide, respectively, which substances are still more noxious.

Another known process for the purification of gases involves the passing of the gas over a layer of active carbon impregnated with silver nitrate. This process has the disadvantage that it uses a costly material that has to be recovered in a time-consuming operation.

The present invention eliminates the above mentioned disadvantages by achieving the contacting of gases with a contact mass consisting of porous material, such as silica gel, active carbon, porous aluminosilicates or metallic oxides, impregnated with an aqueous solution of a trivalent iron salt, such as: ferric chloride, ferric sulphate, ferric nitrate, ammonium ferric alum, potassium ferric alum, ferric hydrogen sulphate, ferric perchlorate, ferric acetate or another salt of trivalent iron, the contacting being performed at temperatures ranging from 0° to 100°C and at any pressure.

The process according to the invention is based on the following chemical reaction:

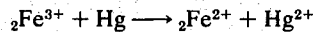

$$2Fe^{3+} + Hg \longrightarrow 2Fe^{2+} + Hg^{2+}$$

Thus, the metallic mercury vapor is transformed into salts, which dissolve in the impregnating solution.

The porous material used has the role of a support for the salt solution. The following materials are preferably used: active carbon, silica gel, porous aluminosilicates or porous metallic oxides ($Al_2O_3$, MgO, ZnO, etc.).

The impregnating solutions may have any concentration, up to saturation.

Below there are given 7 examples of the application of the process and contact mass for the removal of mercury from gases:

EXAMPLE 1

A contact mass is prepared by impregnating active carbon with an aqueous solution of ferric chloride.

The active carbon used may have any origin, in the form of granules, extrudates or tablets, with sizes ranging from 0.5 to 5 mm.

The use of dimensions smaller or larger than those comprised within the above range is not justified. It is preferable to use a carbon with a large pore volume, the size of the granules being 2–3 mm.

The content of ferric chloride on active carbon may be comprised in a wide range, a higher content ensuring a longer period of utilization. The impregnating solution may be acidified with hydrochloric acid.

The following formulation is used:
Active carbon — 100 parts, by weight,
Ferric chloride (100%) — 5–25 parts
Hydrochloric acid ($d=1.18$) — 0–5 parts
Water — 150–200 parts.

After impregnation the excess water is run off from the carbon. The contact mass may be used as such or dried superficially for a maximum of four hours at 60°C.

The contact mass impregnated in this way is arranged in a fixed bed, through which are passed the gases subjected to purification.

The gas may have a relative humidity of 40–80 percent.

The working temperature may be comprised between 0° and 100°C, preferably 20°–40°C; below 0°C work becomes impossible, due to the freezing of the solution.

Temperatures exceeding 100°C cannot be used, on account of the evaporation of the water from the granules.

Depending on the contact time, one obtains the following results, presented in table 1.

TABLE 1

| Crt. No. | Original Hg concentration mg/m$^3$ | Temperature °C | Contact time sec | Ultimate concentration mg Hg/m$^3$ |
|---|---|---|---|---|
| 1 | 2 | 3 | 4 | 5 |
| 1. | 20 | 25 | 3 | 1.2 |
| 2. | 20 | 25 | 7.5 | 0.1 |
| 3. | 20 | 25 | 15 | 0 |
| 4. | 20 | 25 | 30 | 0 |
| 1 | 2 | 3 | 4 | 5 |
| 5. | 20 | 35 | 3 | 1.0 |
| 6. | 20 | 35 | 7.5 | 0.08 |
| 7. | 20 | 35 | 15 | 0 |
| 8. | 40 | 25 | 7.5 | 0.2 |
| 9. | 40 | 25 | 15 | 0 |

EXAMPLE 2

A contact mass is prepared by impregnating silica gel with an aqueous solution of ferric chloride.

The silica gel used is in the form of granules, the sizes of which range from 2 to 4 mm. One may use any commercial silica gel, but it is preferable to use one with larger surfaces and a higher volume of pores.

The formulation used was the following:
- Silica gel — 100 parts, by weight,
- Ferric chloride — 5–15 parts
- Hydrochloric acid — 0–2 parts
- Water — 100 parts.

After impregnation and running-down of the excess solution, the contact mass can be used as such or dried for a maximum of four hours at 60°C.

The contact mass is arranged in a fixed bed through which are passed the gases subjected to purification; the gas may have a relative humidity of 10–60 percent.

The working temperature ranges, as in the preceding example, from 0° to 100°C.

Depending on the contact time, the results presented in table 2 are obtained:

TABLE 2

| Crt. No. | Original Hg concentration mg/m$^3$ | Temperature °C | Contact time sec | Ultimate Hg content mg/m$^3$ |
|---|---|---|---|---|
| 1. | 20 | 25 | 7.5 | 2.5 |
| 2. | 20 | 25 | 15 | 0.25 |
| 3. | 20 | 40 | 7.5 | 1.0 |
| 4. | 20 | 40 | 15 | 0.1 |
| 5. | 20 | 40 | 30 | 0 |
| 6. | 20 | 60 | 7.5 | 0.3 |
| 7. | 20 | 60 | 15 | 0.04 |
| 8. | 20 | 60 | 30 | 0 |

EXAMPLE 3

A contact mass is prepared by impregnating active carbon with an aqueous solution of ferric perchlorate.

The active carbon used is identical with that used in example 1.

The following formulation is used:
- Active carbon — 100 parts, by weight,
- Ferric perchlorate — 5–25 parts,
- Water — 150–200 parts.

One proceeds as in example 1.
The results obtained are given in table 3.

TABLE 3

| Crt. No. | Original Hg content mg/m³ | Temperature °C | Contact time sec | Ultimate Hg content mg/m³ |
|---|---|---|---|---|
| 1 | 2 | 3 | 4 | 5 |
| 1. | 30 | 20 | 3 | 42 |
| 2. | 30 | 20 | 7.5 | 0.1 |
| 3. | 30 | 20 | 15 | 0.01 |
| 4. | 30 | 20 | 30 | - |
| 5. | 30 | 30 | 3 | 0.6 |
| 1 | 2 | 3 | 4 | 5 |
| 6. | 30 | 30 | 7.5 | 0.05 |
| 7. | 30 | 30 | 15 | |
| 8. | 30 | 30 | 30 | |
| 9. | 30 | 40 | 3 | 0.3 |
| 10. | 30 | 40 | 7.5 | |
| 11. | 30 | 40 | 15 | |

EXAMPLE 4

A contact mass is prepared by impregnating silica gel with an aqueous solution of ferric perchlorate.

Commercial silica gel is used, as in example 2.

The formulation used in preparation is the following:
- Silica gel — 100 parts,
- Perchlorate — 5–25 parts,
- Water — 100 parts.

One proceeds as in example 2.
The results obtained are presented in table 4.

TABLE 4

| Crt. No. | Original Hg content mg/m³ | Temperature °C | Contact time sec | Ultimate Hg content mg/m³ |
|---|---|---|---|---|
| 1. | 20 | 30 | 7.5 | 1.5 |
| 2. | 20 | 30 | 15 | 0.1 |
| 3. | 20 | 30 | 30 | 0 |
| 4. | 20 | 56 | 7.5 | ).6 |
| 5. | 20 | 50 | 15 | 0.04 |
| 6. | 20 | 50 | 30 | |

EXAMPLE 5

A contact mass is prepared by impregnating active carbon with an aqueous solution of ferric nitrate.

The following formulation is used in preparation:
- Active carbon — 100 parts, by weight,
- Ferric nitrate — 5–20 parts,
- Water — 150 parts.

One proceeds as in example 1.
The results obtained are given in table 5.

TABLE 5

| Crt. No. | Original Hg content mg/m³ | Temperature °C | Contact time sec | Ultimate Hg content mg/m³ |
|---|---|---|---|---|
| 1. | 20 | 25 | 3 | 0.6 |
| 2. | 20 | 25 | 7.5 | 0.02 |
| 3. | 20 | 25 | 15 | 0 |
| 4. | 20 | 25 | 30 | 0 |

EXAMPLE 6

A contact mass is prepared by impregnating active carbon with an aqueous solution of ammonium ferric alum and sulphuric acid.

The following formulation is used:
- Active carbon — 100 parts, by weight,
- Ammonium ferric alum — 5–20 parts,
- Sulphuric acid — 2–5 parts,
- Water — 150 parts.

After impregnation, the contact mass may be dried for four hours at 80°C, but it can also be used without drying.

The gases may have a relative humidity of 10–50. The temperature may vary within the range of 0°–100°C.

The results obtained are presented in table 6.

TABLE 6

| Crt. No. | Original Hg content mg/m³ | Temperature °C | Contact time sec | Ultimate Hg conent mg/m³ |
|---|---|---|---|---|
| 1. | 30 | 25 | 3 | 0.8 |
| 2. | 30 | 25 | 7.5 | 0.03 |
| 3. | 30 | 25 | 15 | 0 |
| 4. | 30 | 40 | 3 | 0.2 |
| 5. | 30 | 40 | 7.5 | 0 |

EXAMPLE 7

A contact mass is prepared by impregnating active carbon with an aqueous solution of ferric sulphate and sulphuric acid.

The active carbon used is the same as in example 1.
The following formulation is used:
- Active carbon — 100 parts, by weight,
- Ferric sulphate — 5–20 parts,
- Sulphuric acid — 2–5 parts,
- Water — 150 parts.

After impregnating, the contact mass may be used with or without previous drying for four hours, at 80°C.

The gases subjected to purification may have a relative humidity of 10–50 percent. The working temperature may vary between 0° and 100°C.

The results obtained are shown in table 7.

TABLE 7

| Crt. No. | Original Hg content mg/m³ | Temperature °C | Contact time sec | Ultimate Hg content mg/m³ |
|---|---|---|---|---|
| 1. | 20 | 25 | 3 | 0.90 |
| 2. | 20 | 25 | 7.5 | 0.03 |
| 3. | 20 | 25 | 15 | |

The process and contact mass according to the invention offer the following advantages:
- they achieve a total removal of the mercury from the gases;
- they require a simple installation;
- they do not require special utilities and power;
- the process is conducted easily and under safe conditions;
- the contact mass can be prepared easily and is cheap;
- the contact mass has a long useful life before it must be changed.

We claim:

1. A process for the removal of mercury from a gas stream, comprising passing the gas stream through a porous mass selected from the group consisting of silica gel, activated carbon, alumina, silicates and metal oxides impregnated with an aqueous solution of a trivalent iron salt at a temperature between 0°C and 100°C and at at least atmospheric pressure.

2. The process defined in claim 1 wherein said temperature is 20°C to 50°C and said mass comprises a porous material impregnated with an aqueous solution of an iron salt selected from the group which consists of ferric chloride, ferric sulfate, ammonium ferric alum, ferric nitrate, ferric perchlorate, ferric hydrogen sulfate, potassium ferric alum and ferric acetate.

* * * * *